(No Model.)
T. W. SHELTON.
OIL FILTER.
No. 458,075.  Patented Aug. 18, 1891.
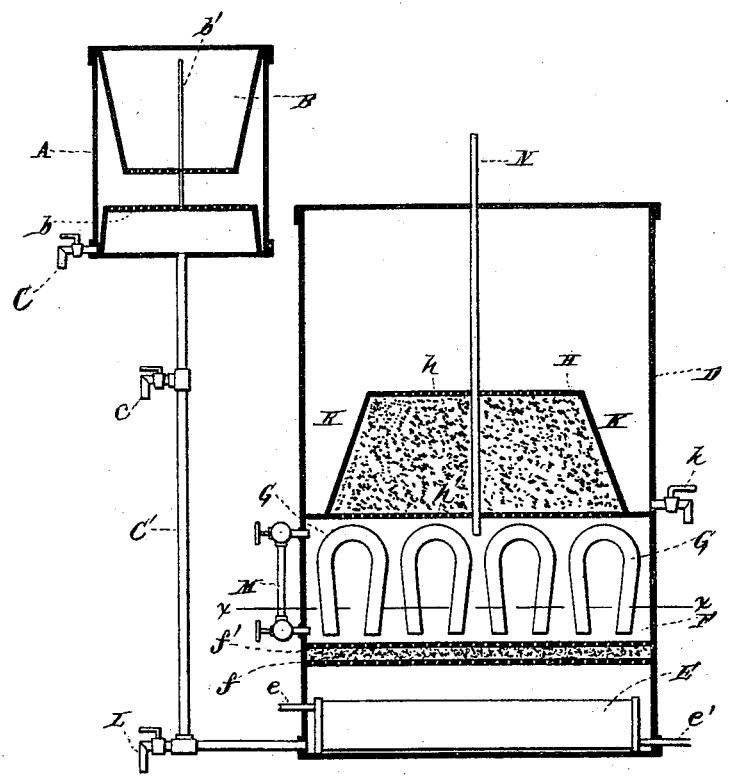
WITNESSES:
INVENTOR
Thomas W. Shelton
BY
E.W. Anderson
his ATTORNEY.

UNITED STATES PATENT OFFICE.

THOMAS W. SHELTON, OF CLEVELAND, OHIO.

OIL-FILTER.

SPECIFICATION forming part of Letters Patent No. 458,075, dated August 18, 1891.

Application filed January 26, 1891. Serial No. 379,118. (No model.)

*To all whom it may concern:*

Be it known that I, THOMAS W. SHELTON, a citizen of the United States, and a resident of Cleveland, in the county of Cuyahoga and State of Ohio, have invented certain new and useful Improvements in Oil-Filters; and I do declare the following to be a full, clear, and exact description of the invention, such as will enable others skilled in the art to which it appertains to make and use the same, reference being had to the accompanying drawing, and to letters of reference marked thereon, which form a part of this specification.

The figure of the drawing is a vertical sectional view.

The invention has for its object the provision of a filter for oils, and one especially adapted to remove all dirt and foreign matter from lubricating-oil which has been once used and render it fit to be again used, thereby effecting a great saving of oil; and the invention consists in the novel construction and combination of the various parts comprising the device, as hereinafter set forth.

In the accompanying drawing, illustrating the invention, the letter A represents the receiving tank or reservoir into which the oil to be treated is placed. In the upper portion of this tank or reservoir is a chamber B, having a perforated bottom, which will at once remove the coarsest impurities of the oil, which, after passing through said screen, falls upon a second and more finely perforated screen $b$. A vent-pipe $b'$ is provided for air or gas which may be formed. A faucet C is provided for drawing off any oil that may be in the reservoir when it is desired to cleanse the latter.

C' is a pipe communicating with the lower portion of tank A for the purpose of conveying the oil to and into main filtering chamber or tank D, a regulating-cock $c$ being provided in said pipe. The location of the two tanks A and D is such that the oil will flow into tank D under the influence of gravity. In the lower portion of this tank is a metal tube E, connected at one end to a steam or hot-air pipe $e$, a discharge $e'$ being provided at the opposite end. This tube or heater is for the purpose of heating the water in the chamber F in order that the oil may be kept in a fluid state.

Supported or fastened to the interior side walls of the tank at the upper portion of chamber F are the perforated filtering plates or screens $f f'$, spaced a short distance apart and having in such intervening space a layer of cotton-batting or other suitable filtering substance. Above screen $f'$ are supported magnets G. The oil, being lighter than water and kept in an extreme fluid state by the raised temperature thereof, will pass up and through screens $f f'$ and their intervening layer of filtering material, and as the said screens are of finer texture than those in the reservoir A the oil will part with still more of its impurities. The magnets G will then remove any particles of iron or mineral substance that may be in the oil.

K is a box (shown as being in the form of a truncated cone) suitably supported in the tank and containing charcoal or other similar filtering substance. This box is located above magnets G and is provided with a perforated top plate $h$ and bottom plate $h'$, which may be of different degrees of fineness. The oil in passing through these screens and the charcoal between will have its remaining impurities removed and will be discharged into the chamber K, from which it may be drawn by a faucet $k$.

L represents a faucet for drawing off the water in main filtering-chamber when it is desired to clean the parts.

M is a gage-glass for keeping the water in chamber F at the proper height, which is preferably up to the point indicated by the dotted line X X in the figure of the drawing. N is a vent-tube for air or gas. In case of oils which mix readily with water the water in chamber F may be dispensed with and the chamber filled with oil. The heater E may also be dispensed with. It will be seen that by passing the oil up through the various screens and filtering-layers said screens and layers do not become clogged with the dirt and impurities of the oil as quickly as when the oil is passed down therethrough.

This device will effect a great saving of oil, as the waste oil collected in suitable reservoirs by being passed through this filter will be entirely freed from all dirt and metallic sediment which might injure the bearing-surfaces to which the oil was applied. The various screens may be easily cleaned and the cotton-batting or other material easily and cheaply renewed. The charcoal may be purified by burning, and thus rendered capable of being again used.

Having thus described the invention, what I claim as new, and desire to secure by Letters Patent, is—

1. The oil-filter comprising the receiving tank or reservoir having therein the perforated filtering-screens, the main filtering chamber or tank having therein the chamber F, screens $f$ and $f'$, magnets G, filtering material between screens $f$ and $f'$, the filter-box above said magnets, the oil-receiving chamber, the pipe connecting the two tanks, and suitable gages and discharges, substantially as specified.

2. The oil-filter comprising the receiving tank or reservoir, the chamber B therein, having the perforated bottom, the perforated screen below said chamber, and the conducting-pipe, in combination with the main filter having the chamber F in its lower portion, into which said conducting-pipe leads, the heating-drum in said chamber, the screens $f$ $f'$ above said chamber, the filtering material between said screens, the magnets, the filter-box above the magnets, and the oil-chamber, substantially as specified.

In testimony whereof I affix my signature in presence of two witnesses.

THOMAS W. SHELTON.

Witnesses:
E. B. PATTERSON,
E. K. ISHAM.